(12) United States Patent
Viegener

(10) Patent No.: US 6,726,256 B2
(45) Date of Patent: Apr. 27, 2004

(54) FITTING OR MOUNTING PART FOR ESTABLISHING A PRESSED CONNECTION WITH AN INSERTED TUBE END

(75) Inventor: Walter Viegener, Attendorn (DE)

(73) Assignee: Franz Viegener II GmbH & Co. KG, Attendorn (DE)

(*) Notice: Subject to any disclaimer, the term of this patent is extended or adjusted under 35 U.S.C. 154(b) by 0 days.

(21) Appl. No.: 10/349,999

(22) Filed: Jan. 24, 2003

(65) Prior Publication Data
US 2003/0107215 A1 Jun. 12, 2003

Related U.S. Application Data

(63) Continuation-in-part of application No. 09/959,012, filed on Oct. 17, 2001.

(30) Foreign Application Priority Data
Jan. 25, 2002 (DE) ..................... 202 01 074 U

(51) Int. Cl.⁷ ................................. F16L 13/14
(52) U.S. Cl. ................... 285/382; 285/379; 285/93; 285/13
(58) Field of Search .............. 285/382, 379, 285/93, 13, 256, 382.1, 382.2, 14, 382.4

(56) References Cited

U.S. PATENT DOCUMENTS

| | | |
|---|---|---|
| 1,848,198 A | 3/1932 | Reid |
| 1,901,820 A | 3/1933 | Parker |
| 2,410,600 A * | 11/1946 | Cowles ................ 285/256 |
| 3,210,102 A | 10/1965 | Joslin |
| 4,034,994 A * | 7/1977 | Ohta et al. ............ 285/379 |
| 4,130,302 A | 12/1978 | Mitchell et al. |
| 4,344,461 A | 8/1982 | Beune et al. |
| 4,834,430 A | 5/1989 | Vassallo et al. |
| 4,902,049 A | 2/1990 | Umehara |
| 5,484,174 A | 1/1996 | Gotoh et al. |
| 5,927,763 A | 7/1999 | Mehr |
| 6,260,891 B1 | 7/2001 | Foering et al. |
| 6,340,181 B1 | 1/2002 | Amatsutsu |
| 6,581,983 B1 * | 6/2003 | Viegener ............... 285/382 |

FOREIGN PATENT DOCUMENTS

| | | |
|---|---|---|
| DE | 297 06 408 U1 | 7/1997 |
| DE | 197 22 935 C1 | 7/1998 |
| DE | 298 13 935 U1 | 11/1998 |
| DE | 299 15 400 U1 | 1/2000 |
| DE | 100 07 914 C1 | 9/2001 |
| EP | 0 343 395 A2 | 11/1989 |
| EP | 0 343 395 B1 | 11/1989 |
| EP | 0 870 964 A1 | 10/1998 |
| JP | 08226582 A | 9/1996 |
| WO | WO 97/42440 | 11/1997 |
| WO | WO 98/11377 | 3/1998 |

* cited by examiner

Primary Examiner—David Bochna
(74) Attorney, Agent, or Firm—Barnes & Thornburg

(57) ABSTRACT

A fitting or a mounting part including an end section extending in a longitudinal direction, which end section can be pressed together with a tube for establishing a connection. The fitting or mounting part has a ring-shaped elevation on the end section forming a space, a sealing ring in the elevation and at least one flow channel in the elevation. The flow channel extends diagonally to a plane in a longitudinal direction of the end section and changes a depth of the space.

19 Claims, 3 Drawing Sheets

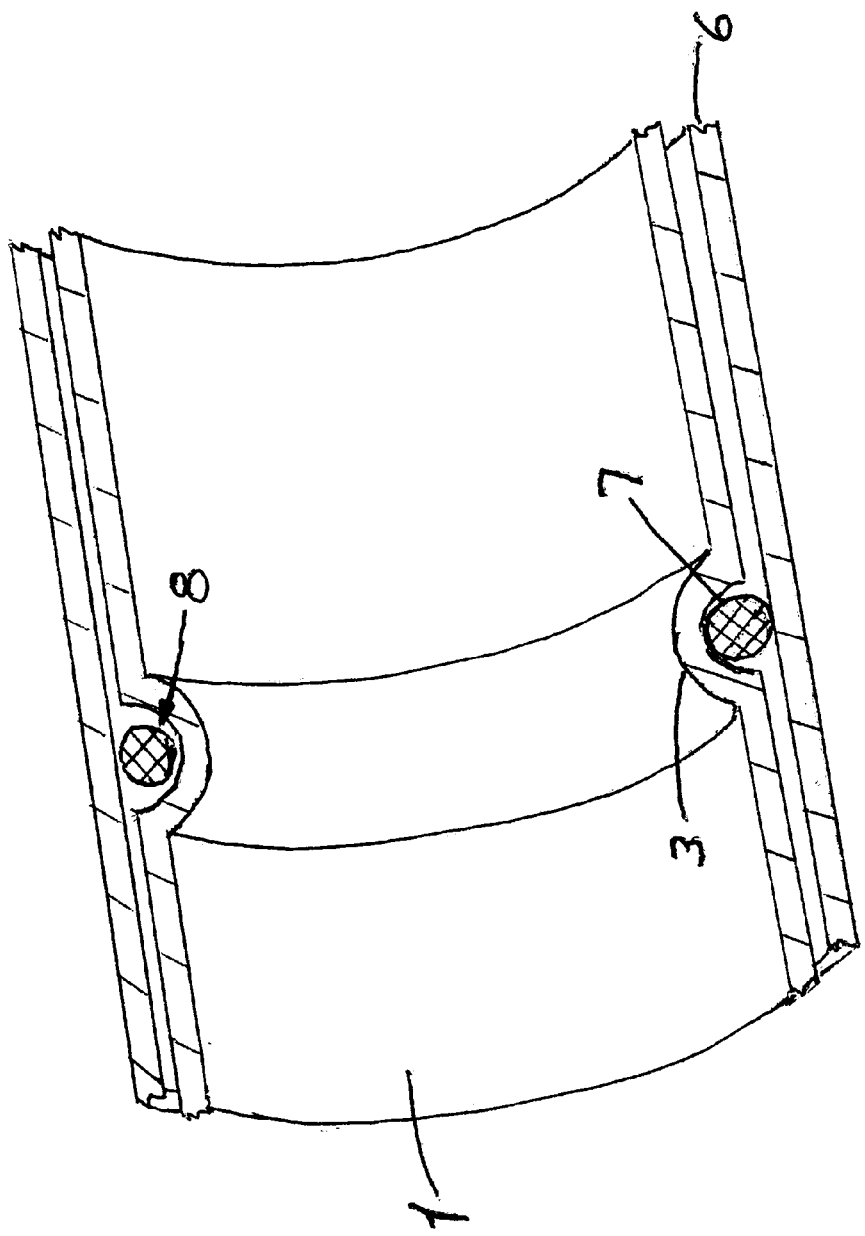

FITTING OR MOUNTING PART FOR ESTABLISHING A PRESSED CONNECTION WITH AN INSERTED TUBE END

CROSS-REFERENCE

This is a continuation-in-part application from U.S. patent application Ser. No. 09/959,012 filed Oct. 17, 2001, which is hereby incorporated by reference. This continuation-in-part application claims priority to German Application No. 20201074.0 filed Jan. 25, 2002, which is hereby incorporated by reference.

BACKGROUND AND SUMMARY OF THE INVENTION

The present invention relates to a fitting or mounting part for a connection with a tube. The fitting part has an end section extending in a longitudinal direction, which end section can be pressed together for establishing a connection. The end section has a ring-shaped elevation in which a sealing ring is arranged. Such a fitting or such a mounting part is usually used for establishing a pressed connection. A tube end is inserted into the end section with the end section constructed as a connection piece with the tube, which are then cold-formed by a pressing tool.

In order to be able to recognize that a pressing point of such a connection is not yet pressed together, it is suggested in German Patent Document DE 100 07 914 and corresponding U.S. patent application Ser. No. 09/959,012 to provide a bulge at an elevation of the connection piece of the fitting or of the mounting part, by which bulge an intentional leakage is provided until a definite pressing-together has taken place. Such a bulge for an intended leakage in the not pressed-together condition has been successful per se because it is easily recognizable during a mounting whether the pressing together had accidentally been forgotten. However, it has to be ensured that, irrespective of how the pressing tool is applied to the end section, a tight pressed connection is provided.

Therefore, the present invention provides for a fitting or a mounting part which, in the not pressed-together condition, offers an intended leakage and which subsequently can be sealed off in a reliable manner by a pressing together.

According to the present invention, the fitting or mounting part includes an end section extending in a longitudinal direction, which end section can be pressed together with a tube for establishing a connection. The fitting or mounting part has a ring-shaped elevation on the end section forming a space, a sealing ring in the elevation space and at least one flow channel provided in the elevation. The flow channel extends diagonally to a plane in a longitudinal direction of the end section and changes a depth of the space. This diagonal arrangement of the flow channel lengthens the flow channel along the elevation having the sealing ring so that an area of the flow channel to be pressed together is also lengthened. As a result of the longer pressed distance, the reliability of the sealing is increased during the pressing because the flow channel can be pressed and sealed off at different points along its length. The flow channel may have a relatively small cross-section in order to minimize a stressing of the channel's material during the pressing and to avoid a formation of cracks.

According to an embodiment of the invention, the flow channel is arranged at an angle of at least 10°, preferably more than 20°, with respect to the longitudinal direction of the end section. In the case of a tube-shaped construction of the end section, the longitudinal direction of the end section is the flow direction, the flow channel then extending on the interior side of the end section and the angle being measurable as seen in a sectional top view. The flow channel may be constructed uniformly at an angle with respect to the longitudinal direction or have one or more curvatures, so that the angle would have to be considered as an average value. If the end section is constructed in a tube shape, the flow channel would extend in a plane perpendicular to the longitudinal direction, preferably around at least one-tenth of the circumference of the end section. This ensures that at least a portion of the flow channel is arranged in an area which is not provided in the gap between two cheek plates of a pressing tool.

The length of the flow channel is greater than and may be at least five times as large as the width of the flow channel.

According to another embodiment, the flow channel extends in a thread-type manner in the longitudinal direction from one side of the elevation to the other side of the elevation. As a result, the flow channel is lengthened to an extreme degree and has to be sealed off in the area of the sealing ring only at an arbitrary point by pressing in order to ensure that the thus established connection arrangement will be permanently tight.

The flow channel may be formed by an indentation in the area of the elevation. This indentation may be a plastic indentation and may be formed by a stamping as well as by a reduction of the wall thickness of the elevation.

In its cross-section, the flow channel preferably has an essentially semi-circularly or semi-ovally open construction toward the interior side of the end section. The height of the flow channel, thus the distance between the end section and the sealing ring, is relatively short in order to obtain a tightening even by means of a small deformation and in order to minimize the stressing of the material in the area of the flow channel during the pressing. In this case, the flow channel may have a rounded construction at the transition to the elevation or to the end section so that no sharp edges are formed which could damage the sealing ring.

The connection arrangement between the fitting part and the tube may be used in the field of sanitary installations or when laying other pipes or tubes.

These and other aspects of the present invention will become apparent from the following detailed description of the invention, when considered in conjunction with accompanying drawings.

BRIEF DESCRIPTION OF THE DRAWINGS

FIG. 3 is a perspective sectional view of another embodiment of a fitting or mounting part of a connection arrangement in the not pressed-together condition, according to the present invention.

DETAILED DESCRIPTION OF THE PREFERRED EMBODIMENTS

Figure 1A:
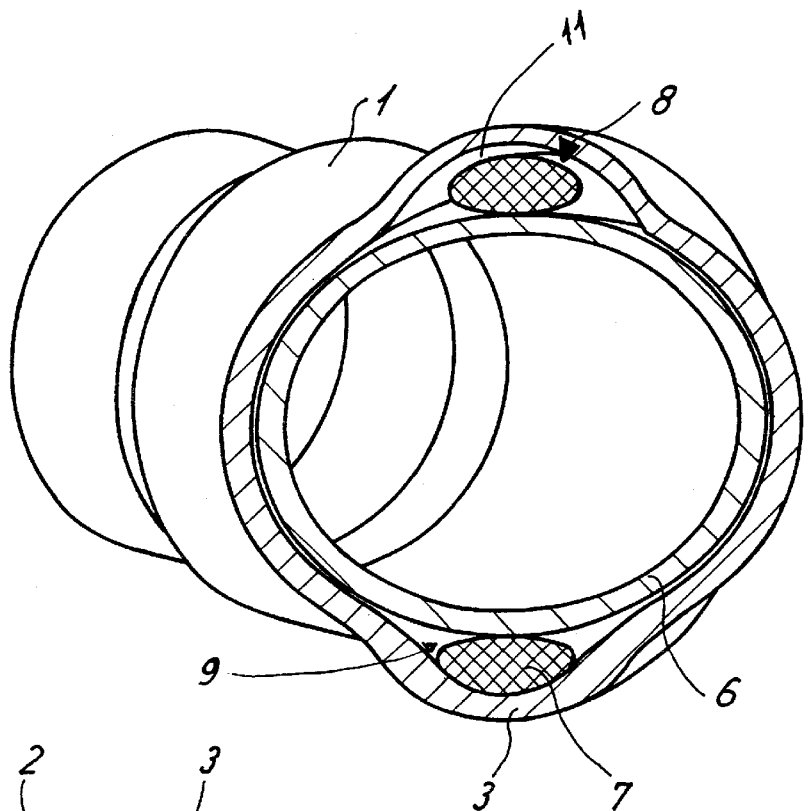
FIG. 1A is a perspective sectional view along a flow channel of a first embodiment of a fitting or mounting part, according to the present invention, in a connection arrangement in the not pressed-together condition.

A fitting or a mounting part 1, which may be made of metal, preferably copper, gun metal, stainless steel or steel, comprises an end section 2 which can be pressed. The end section 2 generally has a tube-shaped construction. On the end section 2, a ring-shaped elevation 3 is constructed which may be adjoined by an exterior or outer section 4. The outer section 4 may be used for an initial guiding of a tube 6 which is inserted into the fitting or mounting part 1, which may be a tube-shaped component 1. The tube 6 is inserted up to a stop 5, which stop 5 may be constructed as a conical tapering.

In the ring-shaped elevation 3, a space 9 exists in which a sealing ring 7 is arranged. The sealing ring 7 may rest against the tube 6 with a slight play or a slight press fit. In the elevation 3, a groove or flow channel 8 is provided that changes a depth of the space 9 and, in the not pressed-together condition, a distance or gap 11 for the guiding-through of a fluid exists between the sealing ring 7 and a wall of the flow channel 8. Because the tube 6 is pushed with a slight play into the end section 2 and the exterior section 4 of the fitting or mounting part 1, a slight gap 10 may be formed between the end section 2 and/or the exterior section 4 and the tube 6, so that a liquid, air or gas can flow from the tube-shaped component 1 or tube 6 by way of the gap 11 into the flow channel 8 and from there through slight gap 10 to the outside. Therefore, should the pressing-together have been forgotten after the tube 6 was inserted into the fitting part 1, this will immediately be noticeable after a filling of the pipe system with a liquid, air or gas.

In its cross-section, the flow channel 8 may have an oval or rounded construction shape which is open toward the sealing ring 7. The transition between a wall of the exterior section 4, the elevation 3 or the end section 2 and the flow channel 8 may preferably have a rounded construction in order to minimize a stressing of the material by a deformation at the flow channel 8 during a pressing-together.

Figure 1C:
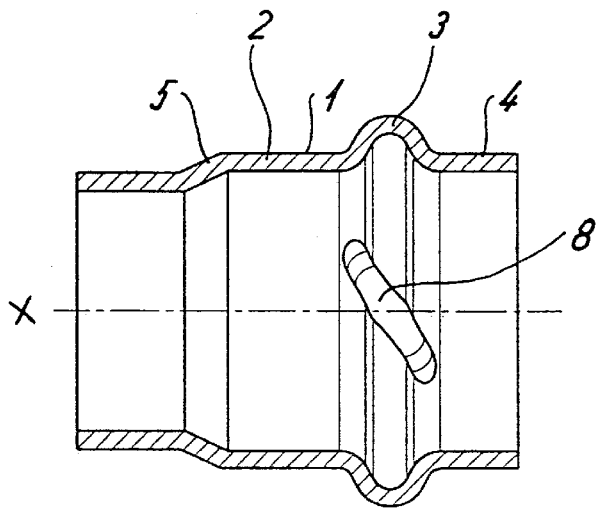
FIG. 1C is a sectional view of the fitting part of FIG. 1A.
Figure 1B:
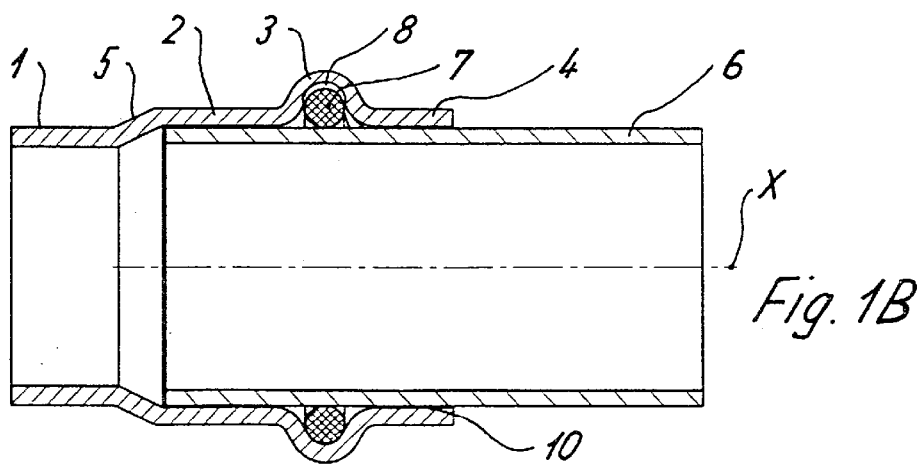
FIG. 1B is a sectional view of the connection arrangement of FIG. 1A.

The flow channel 8 is arranged diagonally to a longitudinal direction of the fitting part 1, the longitudinal direction extending in a flow direction essentially parallel to longitudinal axis X. The length of the flow channel 8 is greater than and may be at least five times as large as the width of the flow channel 8. In its cross-section, the flow channel 8 preferably has an essentially semi-circularly or semi-ovally open construction toward an interior side of the end section 2. The flow channel 8 may extend in an interior circumference of the end section 2 and in a linear manner at an angle of at least 10° and preferably approximately at least 20° to 30° with respect to the longitudinal direction of the end section 2. (See FIG. 1C.) The flow channel 8 may extend around at least one-tenth of the circumference of end section 2 and may extend in a thread-type manner in a longitudinal direction from one side of the elevation 3 to another side of the elevation 3. (See FIGS. 1C and 2B.) Other angles and shapes of flow channel 8 may also be used.

The flow channel 8 may visibly protrude to the outside of the fitting part 1. The flow channel 8 may be formed by an indentation in the area of the elevation 3. This indentation may be a plastic indentation and may be formed by stamping as well as by a reduction of the wall thickness of the elevation 3 (not shown).

As a result of the pressing-together by a pressing tool (not shown), the flow channel 8 may be pressed toward its inside, so that the gap 11 formed by the flow channel 8 and sealing ring 7 is filled with material of the wall of the flow channel 8 and/or of the sealing ring 7 and a sealed-off connection is established between the tube-shaped component 1 and the tube 6. In addition, the sealing ring 7 is firmly pressed against the tube 6 during the pressing-together. Because of the irreversibility of the pressing operation, the established pressed connection will also be tight at high pressures. The pressing takes place on the elevation 3, and optionally on one or both sides of the elevation 3 in order to provide a form-fitting protection against torsion by the pressing. The pressing may take place as described in German Patent Document DE 100 07 914 C1.

Figure 2A:
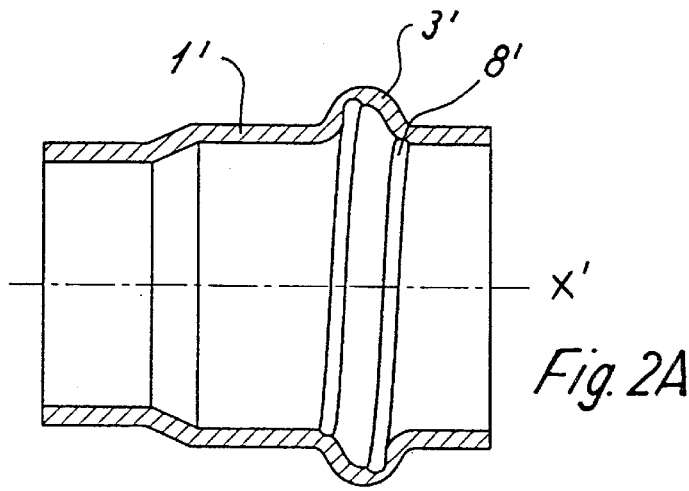
FIG. 2A is a sectional view of a fitting part of a second embodiment, according to the present invention.
Figure 2B:
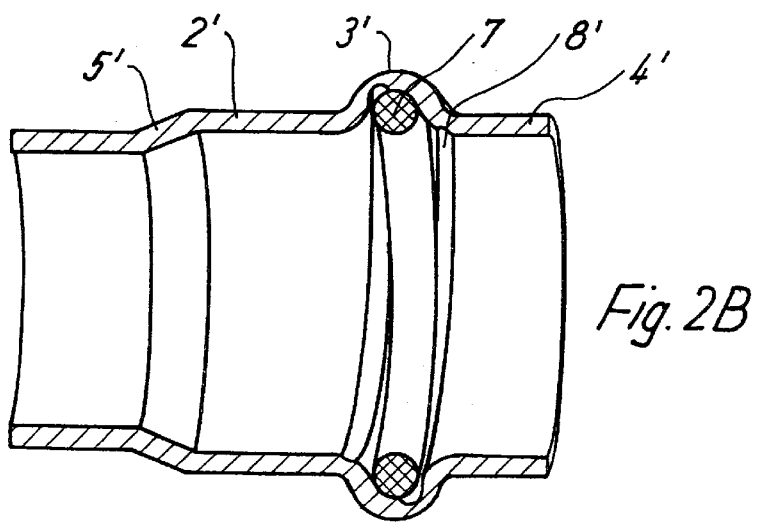
FIG. 2B is a sectional view of the fitting part of FIG. 2A with an inserted sealing ring.
Figure 2C:
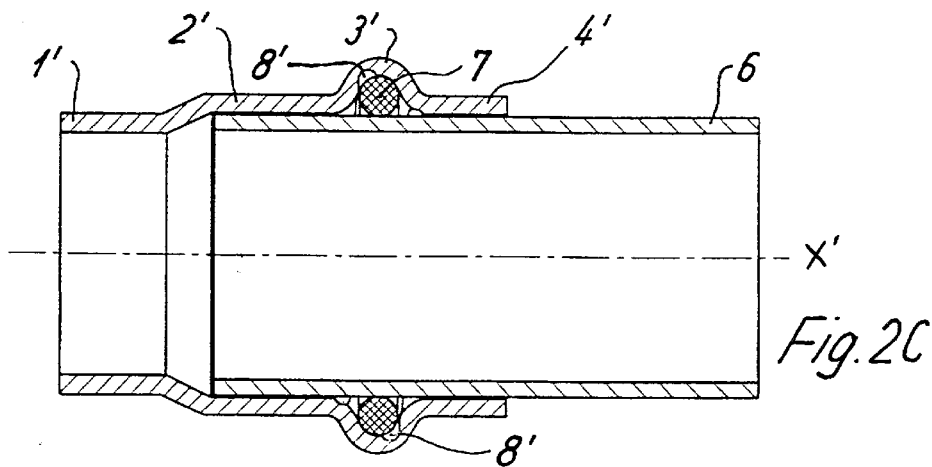
FIG. 2C is a sectional view of a connection arrangement with the fitting part according to FIG. 2A in the not pressed-together condition.

FIGS. 2A–2C show a second embodiment of a fitting part 1', according to the present invention. A ring-shaped elevation 3' is arranged on a thin-walled end section 2' of the fitting 1', in which elevation 3' a sealing ring 7 is accommodated. A thread-type flow channel 8' may be formed in the area of the elevation 3'. By this diagonal arrangement of the flow channel 8' relative to longitudinal direction X' of the end section 2', the flow channel 8' extends in the area of the elevation 3' preferably approximately once around an entire interior circumference of the end section 2'. A tight pressing-together even at only one point of the flow channel 8' ensures a tight connection arrangement.

In the illustrated embodiments of FIGS. 1A–2C, only one flow channel 8, 8' was provided in the fitting parts 1, 1', respectively. It is also possible to construct or arrange two or more flow channels 8, 8' in the area of the elevations 3, 3'. In addition, a cross-section of the flow channels 8, 8', instead of having a partially round or oval open construction, may have different shapes.

According to another possible embodiment (see FIG. 3), a ring-shaped elevation 3 may be constructed on an interior tube-shaped component 1, onto which ring-shaped elevation 3 a tube 6 is fitted. At least one flow channel 8 for generating an untight point or points or leakage is provided on the interior tube-shaped component 1.

Although the present invention has been described and illustrated in detail, it is to be clearly understood that this is done by way of illustration and example only and is not to be taken by way of limitation. The scope of the present invention is to be limited only by the terms of the appended claims.

What is claimed is:

1. A fitting or mounting part comprising:
   an end section extending in a longitudinal direction, which end section can be pressed together with a tube for establishing a connection;
   a ring-shaped elevation on the end section forming a space;
   a sealing ring in the elevation; and
   at least one flow channel in the elevation, which flow channel extends diagonally to a plane in a longitudinal direction of the end section and changes a depth of the space.

2. The fitting or mounting part according to claim 1, wherein the flow channel is arranged at an angle of at least 10° with respect to a longitudinal direction of the end section.

3. The fitting or mounting part according to claim 2, wherein the angle is approximately 30°.

4. The fitting or mounting part according to claim 1, wherein a length of the flow channel is greater than a width of the flow channel.

5. The fitting or mounting part according to claim 4, wherein the length of the flow channel is at least five times greater than the width of the flow channel.

6. The fitting or mounting part according to claim 1, wherein the end section has a tube-shaped construction.

7. The fitting or mounting part according to claim 6, wherein the flow channel extends around at least one-tenth of the circumference of the end section.

8. The fitting or mounting part according to claim 1, wherein the flow channel extends in a thread-type manner in a longitudinal direction from one side of the elevation to another side of the elevation.

9. The fitting or mounting part according to claim 1, wherein the flow channel is formed by an indentation in an area of the elevation.

10. The fitting or mounting part according to claim 9, wherein the indentation is a deformed plastic indentation.

11. The fitting or mounting part according to claim 1, wherein, in its cross-section, the flow channel is essentially one of semi-circularly and semi-ovally open toward an interior side of the end section.

12. The fitting or mounting part according to claim 1, wherein the flow channel has a rounded construction at a transition of one or more of the elevation, end section and exterior section.

13. The fitting or mounting part according to claim 1, wherein the flow channel is shaped to create a leak when the end section receives the tube before being pressed together.

14. The fitting or mounting part of claim 1, wherein there is a connection arrangement between the fitting or mounting part and the tube such that they are held on one another in a sealed-off manner by the sealing ring.

15. The fitting or mounting part according to claim 1, wherein the flow channel extends around at least one-tenth of the circumference of the end section.

16. A fitting or mounting part comprising:
   an end section;
   a ring-shaped elevation on the end section;
   a sealing ring in the elevation; and
   at least one flow channel in the elevation which flow channel extends diagonally to a plane in a longitudinal direction of the end section and providing a leakage between the fitting or mounting part and a tube received by the end section before the fitting or mounting part and the tube are pressed together.

17. The fitting or mounting part of claim 16, wherein the elevation is on an exterior of the fitting or mounting part, and the sealing ring is on an interior of the fitting or mounting part.

18. The fitting or mounting part of claim 16, wherein the elevation is on an interior of the fitting or mounting part, and the sealing ring is on an exterior of the fitting or mounting part.

19. The fitting or mounting part of claim 16, wherein the flow channel radially extends a portion of the elevation.

* * * * *